United States Patent Office 3,281,112
Patented Oct. 25, 1966

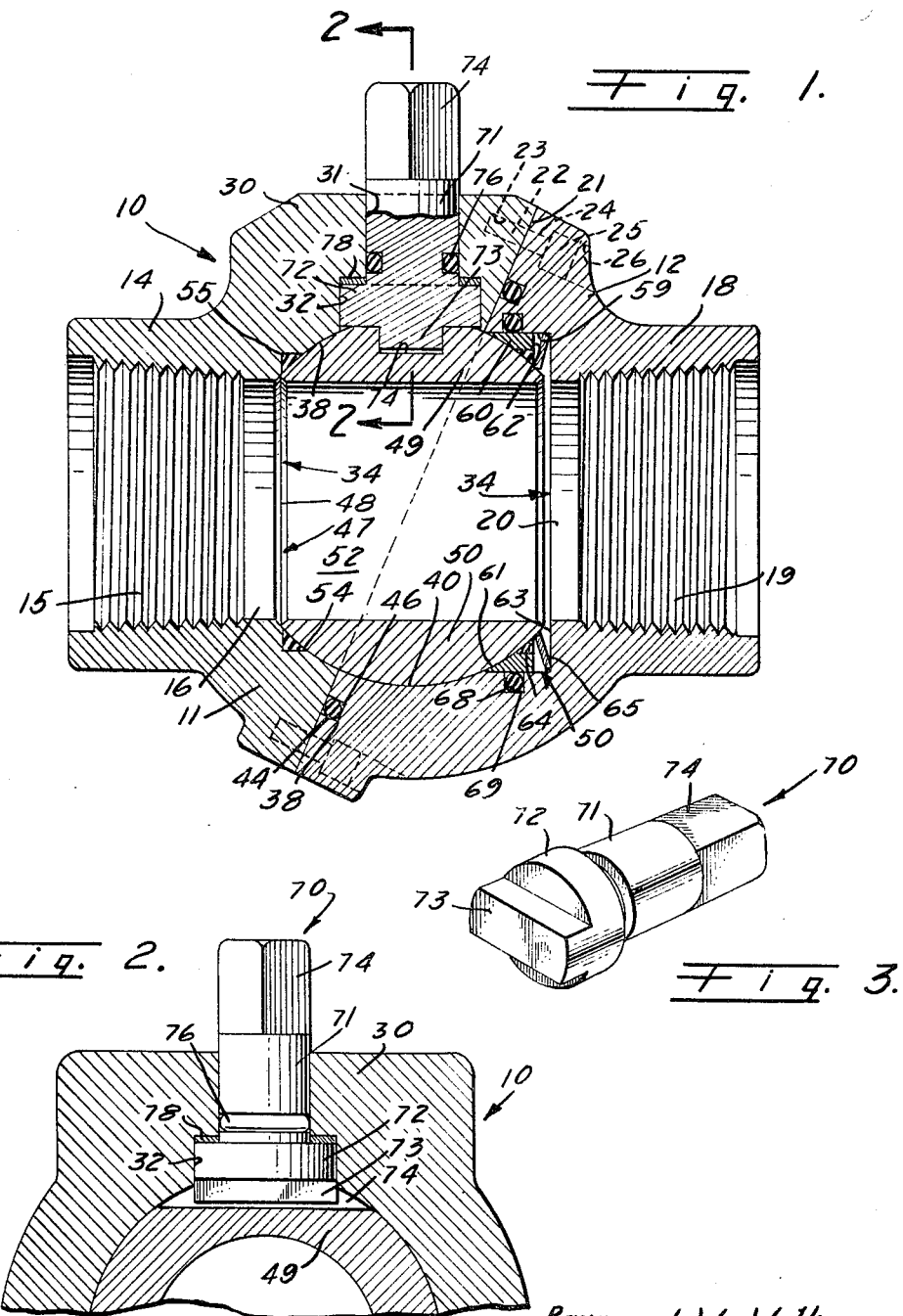

3,281,112
BALL VALVE FOR HIGH PRESSURES
Raymond W. Walker, Huntington Beach, Calif., assignor to Shaffer Tool Works, Brea, Calif., a corporation of California
Filed Dec. 18, 1962, Ser. No. 245,440
1 Claim. (Cl. 251—174)

The invention relates to valves and relates more particularly to improvements in ball valves.

While the invention has particular utility in connection with ball valves for controlling the flow of fluids under relatively high pressures and is shown and described in such connection, it is to be understood that its utility is not confined thereto.

As is well known, various problems and difficulties are encountered in the provision of ball valves for controlling the flow of fluids under relatively high pressures and it is an object of the present invention to provide a ball valve which will solve these problems and overcome such difficulties.

More particularly, one of the difficulties involved in the provision of a suitable ball valve for handling fluids under high pressure is that of leakage and it is another object of the present invention to provide a valve of this character wherein leakage of fluids under high pressure therein is eliminated.

It is still another object of the invention to provide a valve of this character that is relatively easy to operate.

It is a further object of the invention to provide a valve of this character that is easily assembled.

It is a still further object of the invention to provide a valve of this character that is easily disassembled for servicing, and the like.

It is another object of the present invention to provide a valve of this character wherein machining of parts thereof is greatly simplified.

It is still another object of the invention to provide a valve of this character wherein elaborate threaded connections are eliminated.

It is a further object of the present invention to provide a valve of this character wherein manufacturing costs are relatively low.

It is a still further object of the invention to provide a valve of this character that is simple in construction and reliable in operation.

The characteristics and advantages of the invention are further sufficiently referred to in connection with the following detailed description of the accompanying drawings, which represent one embodiment. After considering this example, skilled persons will understand that many variations may be made without departing from the principles disclosed, and I contemplate the employment of any structures, arrangements or modes of operation that are properly within the scope of the appended claims.

Referring to the drawings, which are for illustrative purposes only:

FIG. 1 is a longitudinal sectional view of a valve embodying the present invention;

FIG. 2 is a sectional view taken on line 2—2 of FIG. 1; and

FIG. 3 is a perspective view of the actuating stem.

Referring more particularly to the drawing, there is shown a valve having a casing, indicated generally at 10, comprising a casing member 11 and a casing member 12.

Casing member 11 has a hollow nipple 14, shown in FIG. 1 as being arranged horizontally, said nipple 14 having an internally threaded outer end portion 15 forming a threaded box for threadable connection to the adjacent externally threaded pin of a pipe, or the like, not shown. At the inner end of the box 15 there is an axially arranged passage portion 16.

Casing member 12 is also provided with a nipple, indicated at 18, which extends horizontally outwardly and is in axial alignment with the box 15 and passage portions 16 of the casing member 11. Casing member 12 has an internally threaded outer end portion or box 19 for threadable connection with an externally threaded pin or end portion of a pipe, or the like, not shown. Inwardly of the box 19 there is a passage portion 20 in axial alignment with said box.

The parting line or plane of the casing 10 is arranged diagonally relative to the axis of the passage portions of the casing, said parting line or plane being indicated at 21. The casing members are secured together by a plurality of annularly spaced screws 22, inner end portions of said screws being threadably received in tapped openings 23 in the casing member 11. Outer end portions of the screw being received in bores 24 in the casing member 12, said bore being aligned with the tapped bores 23. Heads 25 of the screws 22 are received in enlarged bores 26 at the outer ends of the bores 24.

At the top side the casing 10 is thickened to provide a boss 30, the major portion of said boss being in the casing member 11 and there is an upwardly extending cylindrical bore 31 in said boss. At the lower end of bore 31 there is an enlarged cylindrical bore or counter bore portion 32 which extends into and communicates with the top of a valve chamber, indicated generally at 34.

The parting line or plane 21 of the casing is so arranged that the counterbore 32 is entirely within the casing member 11. This parting line, or plane, passes through the point of intersection of the horizontal axis, as shown in FIG. 1, of the passage through the valve and the axis of the bore 31.

The upper part 38 of the valve chamber 34 is dome-shape or in the form of a spherical segment, the top part of which connects with the lower end of the counterbore 32. The lower end 40 of said valve chamber is likewise dome-shaped but is inverted or is in the general shape of an inverted spherical segment.

There is sealing means to effect a seal between the adjacent faces of the casing members 11 and 12, said sealing means comprising an O-ring 44 disposed in a groove 46, provided therefor in the face of the casing member 12, said groove and O-ring extending about the valve chamber.

Rotatably disposed within the valve chamber is a valve member, indicated generally at 47, which includes an intermediate cylindrical part 48 disposed in the cylindrical portion of the valve chamber 34, an upper part 49 conforming to the shape of the dome-shaped upper portion 38 of the valve chamber, and a lower portion 50 in the general shape of a spherical segment operably disposed in the part 40 of the valve chamber. Valve member 47 has a passage 52 therethrough coaxial with the passage portions 16 and 20 of the valve casing members 11 and 12, respectively. Valve member 47 is coaxially arranged relative to the bore 31 for operable rotation between a position whereat the ends of the passage 52 in said valve member 47 are in register with said passage portions 16 and 20, respectively, and a position whereat said passage 52 is positioned at right angles to said passage portions so that no fluid can flow through the valve. In other words, the valve member 47 is rotatable on a vertical axis between an open and a closed position.

Adjacent one side of the valve chamber 34 there is a annular groove 54 in the adjacent part of the casing member 11, said groove being concentric with the adjacent passage portion 16 and adjacent the inner end thereof. Within the groove 54 is disposed a sealing member, shown as an O-ring 55, which provides a seal between the casing member 11 and the valve member 47, said seal being effective regardless of the rotatable position of said valve member 47. At the opposite side of the chamber 34 there is sealing means, indicated generally at 58, for providing a seal between the valve member 47 and casing member 12 and also maintains the valve member in sealing engagement with the seal 55.

Sealing means 58 is disposed in a cylindrical recess 59 in the casing member 12, said recess 59 being coaxial with the passage through the valve.

Within recess 59 is slidably disposed an annular collar or seal carrier 60. Inner end 61 of seal carrier 60 conforms to the shape of the adjacent portion of the valve member 47 and is in engagement therewith. The outer end 62 of said seal carrier is normal to the axis thereof and is spaced inwardly of the outer end 63 of the recess 59 which forms a shoulder normal to the axis of said recess. Within the outer end portion of collar 60 is a sealing element 64 which is generally triangular in cross-section. Sealing element 64 may be of any suitable material, such as a plastic. One type of plastic that has been found to be highly effective is "Teflon." "Teflon" is DuPont's registered trademark for its fluorocarbon resins.

The space between the outer end of the collar or seal carrier 60 and the shoulder 63 is exaggerated in the drawing for purposes of clarity. Within said space there is resilient means comprising a disc spring 65 having its large outer end abutting against the shoulder 63 and its smaller inner end engaging the outer end of the seal 64. The spring means 65 urges the seal 64 inwardly to thereby provide a tight seal between the valve member 47 and the inner side of the collar 60 as well as the sealing means 55. Collar or seal carrier 60 is urged against the valve member 47 by fluid pressure in the recess 59.

Sealing means between the casing member 12 and the collar or seal carrier 60 is provided and comprises a seal 68, shown as an O-ring, disposed in an annular groove 69 in the cylindrical wall of the recess 59 provided for said sealing means 68.

Means for rotating the valve member 47 comprises a spindle, indicated generally at 70, having a cylindrical portion 71 rotatably disposed in the bore 31. At the inner end of the cylindrical portion 71 of the actuator 70 is a radially extending annular flange 72 operably disposed in the counterbore 32 and at the under side of the flange 72 is a diametrically extending lug 73 disposed in a slot 74 in the top side of the valve 47, so that when the actuator 70 is rotated the valve 47 is correspondingly rotated to bring the passage 52 in the valve into and out of register with the passage portions 16 and 20, respectively. Actuator 70 has an outer end portion 74 which is provided with a plurality of sides whereby it may be engaged by an actuating tool, such as a wrench, wheel, handle, or the like.

Means for sealing the actuator member 70 is provided and comprises a sealing element, such as an O-ring 76, disposed in an annular groove in the cylindrical portion 71 above the upper end of the counterbore 32. In order to render the actuator member 70 easy to move or rotate, there is provided a low friction bearing element 78 which comprises a washer on the cylindrical portion 71 and resting on the upper side of the flange 72. The top side of the bearing element 78 is in contact with the upper or top wall of the counterbore 32.

It will be noted that by reason of the diagonal or oblique vision plane between the casing members 11 and 12, the lower end of the casing member 11, as shown in FIG. 1, clears the plane of the counterbore 32 so that no part of the casing member 11 will interfer with machining of the counterbore 32.

In assemblying the valve the actuator element or member with its seal 76 and bearing 78 thereon is inserted into the bore 31 and counterbore 32 from the inside of the casing member 11. The seal 55 is placed in the groove 54 and the ball valve 47 inserted so that the slot 74 receives the lug 73. The various parts disposed in the recess 59 of casing member 12 and the groove 69 are positioned in said recess and the seal 44 is disposed in the recess 38. The casing members are then assembled together and secured by means of the screws 24.

With this organization and arrangement of parts the machining of the various parts is greatly simplified and there is no parting line or plane through a seal. Further, the bore 31 is in but one casing member so that the possibility of leakage due to portions of such a bore being in different casing members, is eliminated.

The invention and its attendant advantages will be understood from the foregoing description and it will be apparent that various changes may be made in the form, construction and arrangement of the parts of the invention, without departing from the spirit and scope thereof or sacrificing its material advantages, the embodiment hereinbefore described being merely by way of example.

I claim.

1. A ball valve, comprising:
   (A) a pair of casing members each of which includes
      (a) an outwardly extending nipple with an internally threaded box and a passage portion at the inner end of said box, said boxes and passage portions being in axial alignment,
      (b) said casing members when secured together defining a valve chamber at the inner ends of said passage portions, said valve chamber including a cylindrical center portion, and upper and lower portions in the general shape of spherical segments,
      (c) one of said casing members having a boss at the upper end with a bore therethrough, the axis of which is in line with the longitudinal center of the valve chamber, there being a counterbore at the inner end of said bore, the lower end of said counterbore communicating with the upper end of the valve chamber,
      (d) said casing members having a transverse, diagonal plane of separation passing through the point of intersection of the axis of the passage portions of the casing members and the extended axis of the bore in the boss of said one casing member so that the bore and counterbore are entirely within one of the casing members and the bottom of said one casing member is spaced outwardly of the extended axis of the bore and counterbore a greater distance than said counterbore;
   (B) a movable ball valve member operably mounted in the valve chamber and rotatable on a vertical axis which is also the axis of the bore and counterbore, said ball valve member having a diametrical passage therethrough of the same diameter as said passage portions of the casing members and adapted to be moved between a position in register with said passage portions and a position out of register therewith, said ball valve member also having a cross-slot in the top thereof;
   (C) actuating means for said valve member, said actuating means including
      (a) a cylindrical portion rotatably disposed in the bore,
      (b) a radially extending annular flange at the lower end of said cylindrical portion, said flange being rotatably disposed in the counterbore,
      (c) a diametrical lug at the lower end of the flange operably disposed in the slot of the valve member,
      (d) and an outwardly projecting multi-sided stem for engagement with an actuating tool;

(D) sealing means providing a seal between the actuator member and the casing,
(E) a low friction bearing element disposed between the top of the flange and the top of the counterbore;
(F) sealing means providing a seal between the movable valve member and the adjacent portion of one of the casing members;
(G) the other casing member having a cylindrical recess coaxial with the passage portion thereof and communicating with the valve chamber;
(H) a collar in said recess, said collar having its inner end shaped to conform with and engage the adjacent portion of the valve member, the outer end of said collar being normal to the axis thereof and spaced from the outer wall of said recess;
(I) a seal disposed within the collar and engaging the adjacent surface of the valve member;
(J) a disc spring having its outer end abutting against the outer wall of the recess and its inner end in engagement with the seal within said collar;
(K) sealing means providing a seal between said collar and the casing member in which said collar is disposed;
(L) sealing means between the adjacent faces of said casing members;
(M) and means for securing said casing members together.

References Cited by the Examiner

UNITED STATES PATENTS

| | | | |
|---|---|---|---|
| 743,511 | 11/1903 | Huxley | 251—174 |
| 2,616,386 | 2/1927 | O'Stroske | 251—174 X |
| 2,712,454 | 7/1955 | Love | 251—309 X |
| 2,809,011 | 10/1957 | Davis | 251—175 X |
| 2,868,497 | 1/1959 | Graham | 251—172 |
| 2,919,886 | 1/1960 | Hurst | 251—172 |
| 2,930,575 | 3/1960 | Britton | 251—174 |
| 2,963,262 | 12/1960 | Shafer | 251—174 X |
| 3,091,428 | 5/1963 | Magos | 251—174 X |
| 3,167,300 | 1/1965 | Kaiser | 251—315 |

WILLIAM F. O'DEA, *Primary Examiner.*

CLARENCE GORDON, *Examiner.*